Figure 1:
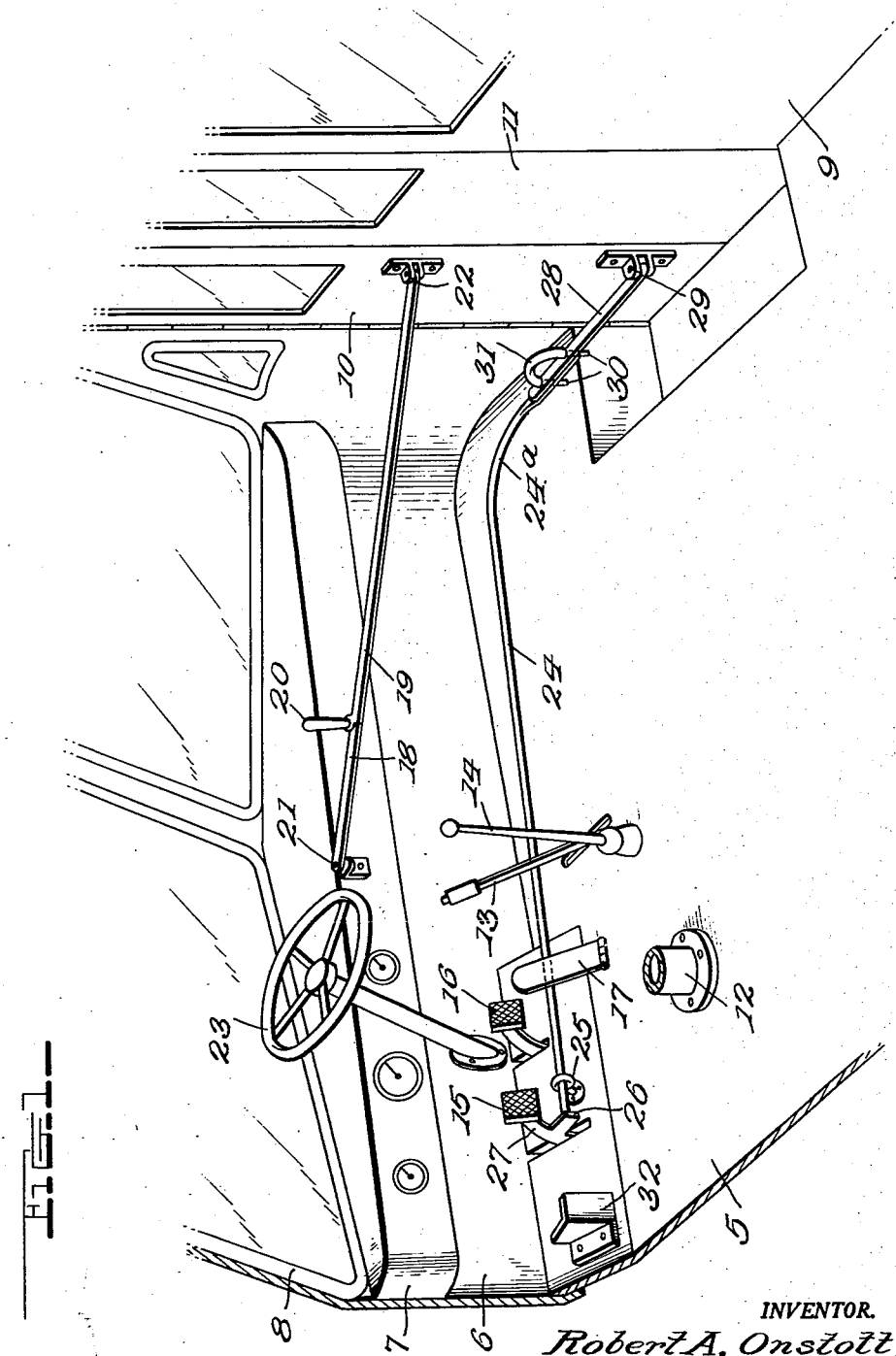

July 22, 1952  R. A. ONSTOTT  2,604,180
SAFETY DOOR LOCK FOR MOTOR VEHICLES
Filed March 2, 1950  2 SHEETS—SHEET 2

INVENTOR.
Robert A. Onstott,
BY
Bryant & Lowry
attys.

Patented July 22, 1952

2,604,180

UNITED STATES PATENT OFFICE 2,604,180

SAFETY DOOR LOCK FOR MOTOR VEHICLES

Robert A. Onstott, Pittsburgh, Pa.; Margaret F. Onstott, executrix of said Robert A. Onstott, deceased, assignor to Margaret F. Onstott Application March 2, 1950, Serial No. 147,270

3 Claims. (Cl. 180—82)

1

This invention relates to certain new and useful improvements in safety door locks for motor vehicles and the like.

The primary object of the invention is to provide a safety door lock for motor and other vehicles, such as coaches, school busses, and public conveyances that is operative for maintaining the entrance and exit door of the vehicle in closed position while the vehicle is in motion and the source of power of engine is in driving communication with ground wheels through the medium of clutch devices.

Numerous accidents have occurred by the purposeful or accidental opening of the doors of a moving motor driven vehicle, and another object of this invention is to provide locking means for holding the doors of a moving vehicle in closed position when the clutch elements between the power plant of the vehicle and the driven axle are engaged.

A still further object of the invention is to provide a safety door lock for motor coaches, school busses and other public conveyances wherein a safety bar extends between the closure door of the vehicle and an extension arm on the shank of a clutch pedal, with such extension arm being engaged by and in the path of movement of the safety bar when the clutch is engaged for the driving of the vehicle and with said extension member displaceable upon depressing of the clutch pedal to permit movement of the safety bar and the opening of the door by the usual door operating mechanism.

A still further object of the invention is to provide a safety door lock of the foregoing character wherein a safety bar extends between the vehicle doors and a shank extension on the clutch pedal with a separable connection in the safety bar that may be manually released to permit opening of the vehicle door in an emergency.

With the above and other objects in view that will become apparent as the nature of the invention is better understood, the same consists in the novel form, combination and arrangement of parts hereinafter more fully described, shown in the accompanying drawings, and claimed.

In the drawings:

Figure 1 is a fragmentary perspective view, partly in section, of the driver's compartment of a motor coach or the like and fragmentarily illustrating the hinged doors for the vehicle and a safety bar interposed between the doors and the shank of a clutch pedal with the clutch in engaged position to restrain movement of the safety bar and opening movement of the doors.

2

Figure 2:
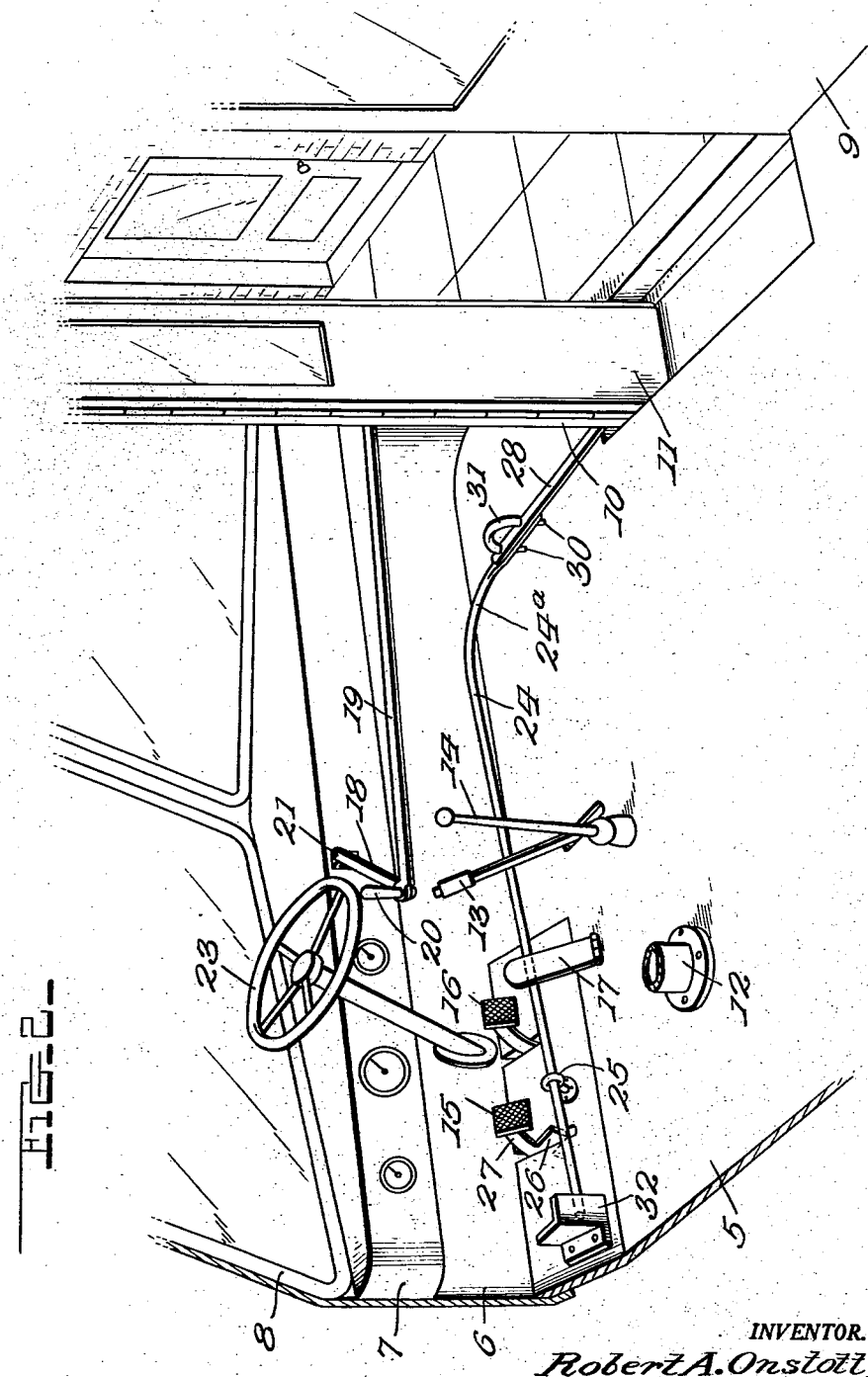

Figure 2 is a fragmentary perspective view, partly in section, similar to Figure 1, showing the clutch depressed and displaced out of the path of movement of the safety bar to permit opening movement of the vehicle door by the usual door operating mechanism.

Referring more in detail to the accompanying drawings, there is fragmentarily illustrated the interior portion of the front end of a motor coach, school bus, or other public conveyance, the reference character 5 designating a floor section, the cowl being shown at 6, the instrument board or panel at 7, and the usual windshields at 8. The side wall 9 has the usual double hinged doors comprising sections 10 and 11. The reference character 12 designates a portion of a pedestal for a driver's seat which was omitted for the better illustration of the invention, the hand brake being shown at 13, while the gear shift lever is indicated by the reference character 14. A clutch pedal is shown at 15 and the numeral 16 denotes the usual brake pedal. The foot operated throttle is located beneath the usual upwardly tensioned accelerator pedal 17.

While the hinged door sections 10 and 11 may be opened and closed in any preferred manner, there is herein shown for illustrative purposes only a well-known type comprising hingedly connected links 18 with an operating handle 20 at the hinged connection, the other end of the link 18 being pivotally mounted as at 21 on a bracket mounted on the instrument board or panel 7, while the outer end of the door opening link 19 is pivotally connected to a bracket 22 carried by the door section 10. It will be understood that the handle 20 for the manually operated door mechanism is in proximity of the steering devices 23 and the operator's seat.

The present invention provides a safety lock for the hinged doors when the clutch is in engaged position for establishing communication between the power plant of the vehicle and the driven axle or wheels, and this safety lock includes an elongated rod 24 extending transversely of the floor 5 adjacent the lower end of the vertical wall or cowl 6 with the end of the rod 24 adjacent the vehicle operator passing through a guide eyelet 25 for abutting contact with an arm 26 extending rearwardly from the shank 27 of the clutch pedal 15. The other end of the rod 24 is rearwardly curved as at 24ª in a direction toward the hinged doors and has a separable connection with a relatively short rod 28 that is pivotally attached to a bracket 29 carried by the lower end of the door section 10 slightly above the plane of the floor 5.

As illustrated in Figures 1 and 2 the adjacent ends of the rod sections 24 and 28 overlap each other and the separable connection between the rod sections comprises registering openings in the overlapping rod sections for the passage of the depending shanks 30 of an inverted U-shaped bolt or clevis 31.

From the above detailed description of the invention, the construction and use thereof should at once be apparent, it being noted that when the vehicle is in motion with the clutch engaged or in a raised position, the extension arm 26 on the shank 27 of the clutch pedal 15 is in the path of movement of the elongated rod 24, and this safety lock mechanism being interposed between the hinged door sections 10 and 11 and the clutch pedal, it is impossible to open the doors by the manually operated door opening mechanism. When the vehicle is brought to a stop and the clutch pedal 15 is disengaged or pressed toward the floor of the vehicle, lowering movement of the clutch pedal shank 27 displaces the extension arm 26 laterally of the elongated rod 24 so that the door opening mechanism may be operated for opening the doors and permit sliding movement of the rod 24 which is limited by an abutment or stop member 32 mounted on the floor of the vehicle to the left of the clutch pedal.

The rod 24 of the safety lock for the doors is positioned in relatively close proximity to the vertical wall section or cowl 6 of the vehicle to be out of the treading path of passengers entering and leaving the vehicle, while the removal of the U-shaped bolt or clevis 31 will break the safety lock connection between the hinged doors and clutch pedal to permit operation of the door operating mechanism for opening of the doors in an emergency. It will also be understood that the elongated rod is positioned sufficiently below the accelerator pedal 17 for the correct operation of the latter.

While there is herein shown and described the preferred embodiment of the invention, it is nevertheless to be understood that minor changes may be made therein without departing from the spirit and scope of the invention as claimed.

I claim:

1. In combination with a vehicle having entrance doors, manually operated opening and closing mechanism therefor, a motor, a driven axle and a clutch and clutch pedal controlling communication between the motor and axle, said clutch pedal having a stem provided with a lateral arm, means interposed between the doors and clutch pedal operative to prevent opening movement of the doors when the clutch is in engaged driving position, said mechanism including a slide rod abutting the clutch pedal arm at one end and pivotally attached at its other end to said doors, a guide for said slide rod fixed adjacent said clutch pedal arm, said slide rod being formed of separable sections whereby upon separation of said sections the doors may be opened when the clutch is in engaged driving position, and manually removable means fixedly connecting said sections.

2. In combination with a vehicle having entrance doors, manually operated opening and closing mechanism therefor, a motor, a driven axle and a clutch and clutch pedal controlling communication between the motor and axle, means interposed between the doors and clutch pedal operative to prevent opening movement of the doors when the clutch is in engaged driving position, said mechanism including a slide rod abutting the clutch pedal at one end and pivotally attached at its other end to said doors, an arm extension on the clutch pedal constituting the abutment for the adjacent end of the slide rod, a guide for said slide rod fixed adjacent said clutch pedal arm and an abutment stop laterally of the clutch pedal for limiting sliding movement of said rod.

3. In combination with a vehicle having entrance doors, manually operated opening and closing mechanism therefor, a motor, a driven axle and a clutch and clutch pedal controlling communication between the motor and axle, means interposed between the doors and clutch pedal operative to prevent opening movement of the doors when the clutch is in engaged driving position, said mechanism including a slide rod abutting the clutch pedal at one end and pivotally attached at its other end to said doors, said slide rod being formed of separable sections whereby upon separation of said sections the doors may be opened when the clutch is in engaged driving position, manually removable means fixedly connecting said sections, an arm extension on the clutch pedal constituting the abutment for the adjacent end of the slide rod, a guide for said slide rod fixed adjacent said clutch pedal arm, and an abutment stop laterally of the clutch pedal for limiting sliding movement of said rod.

ROBERT A. ONSTOTT.

REFERENCES CITED

The following references are of record in the file of this patent:

UNITED STATES PATENTS

| Number | Name | Date |
|---|---|---|
| 1,092,493 | Lawrenz | Apr. 7, 1914 |
| 1,664,042 | McGinley | Mar. 27, 1928 |
| 1,736,189 | Demand | Nov. 19, 1929 |